Patented June 20, 1939

2,162,737

UNITED STATES PATENT OFFICE 2,162,737

PROCESS FOR PRODUCTION OF STABILIZED CRYSTALLINE PROTEOLYTIC ENZYMES

Randolph T. Major, Plainfield, and Alphonse Walti, Westfield, N. J., assignors to Merck & Co. Inc., Rahway, N. J., a corporation of New Jersey No Drawing. Application September 4, 1936, Serial No. 99,418

4 Claims. (Cl. 195—66)

This invention relates to the stabilization and preservation of crystals of proteolytic enzymes obtained from ficus latex.

One of us has succeeded in obtaining ficin in crystalline form, the process for which is covered by co-pending United States patent application Serial No. 94,585, filed August 6, 1936.

By that process, the crystals are obtained directly from the latex by repeatedly filtering the chilled latex through a latex-wax impregnated filter paper and then crystallizing the active material from the pre-treated latex by partial neutralization of the liquid with an alkali, concentration, seeding, or a combination of these methods, or by first filtering the latex and then precipitating the protein fraction with magnesium sulfate, dissolving the precipitate with dilute acid, and partially neutralizing the solution with alkali.

After the crystals had been obtained by the method described in that co-pending application, it was observed that the formed crystals are totally or partly lost when subjected even to such mild treatments as filtration with suction, or drying in a dessicator, or even on centrifugation of the crysta's in a dilute acidulated sodium chloride solution.

It has now been found that such crystalline forms, which can be recrystallized, can be stabilized and preserved by filtering off the crystals on filtering paper and then washing them with an acidulated water, say about 0.001 N-hydrochloric acid.

The crystals thus obtained are then frozen, whereafter the frozen solvent is evaporated off under a high vacuum.

The crystals are then packaged with the exclusion of air, as for instance under a high vacuum or in the presence of an inert gas such as nitrogen, hydrogen or carbon dioxide.

Having thus fully and completely described our invention and the manner in which it is to be used, we do not desire to be limited to any specific manner or mode of application. To those skilled in the art, it will be apparent that various modifications may be employed without departing from the spirit and scope of our invention.

We claim:

1. The process for the stabilization of crystalline proteolytic enzyme from ficus latex, which comprises filtration in an acidulated aqueous solution of an acidity of the order of about 0.001 N-hydrochloric acid, freezing the wet crystals thus obtained, removing the frozen solvent with the aid of a high vacuum, and packaging such crystals under the exclusion of atmospheric action.

2. The process of stabilizing crystalline proteolytic enzyme obtained according to claim 1, which comprises the packaging of such crystals under a high vacuum.

3. The process of stabilizing crystalline proteolytic enzyme obtained according to claim 1, which comprises the packaging of such crystals in the presence of an inert gas.

4. In the process for the stabilization of crystalline proteolytic enzyme from ficus latex, the steps which comprise filtration in an acidulated aqueous solution of an acidity of the order of about 0.001 N-hydrochloric acid, freezing the wet crystals thus obtained, and removing the frozen solvent with the aid of a high vacuum.

RANDOLPH T. MAJOR.
ALPHONSE WALTI.